United States Patent
Tran et al.

(10) Patent No.: US 8,520,413 B2
(45) Date of Patent: Aug. 27, 2013

(54) ADJUSTABLE RESONANT BUCK CONVERTER

(75) Inventors: Ken Tran, North Chelmsford, MA (US); Feng Tian, Salem, NH (US); Franklin Lee, Framingham, MA (US); Wangbo Zhang, Winchester, MA (US)

(73) Assignee: MKS Instruments, Inc., Andover, MA (US)

( * ) Notice: Subject to any disclaimer, the term of this patent is extended or adjusted under 35 U.S.C. 154(b) by 257 days.

(21) Appl. No.: 13/211,892

(22) Filed: Aug. 17, 2011

(65) Prior Publication Data

US 2013/0043854 A1 Feb. 21, 2013

(51) Int. Cl.
*H02M 3/335* (2006.01)

(52) U.S. Cl.
USPC ........ 363/21.03; 323/222; 323/271; 323/287; 363/39

(58) Field of Classification Search
USPC ................. 323/222, 265, 271, 282, 287, 351; 363/21.02, 21.03, 39, 123
See application file for complete search history.

(56) References Cited

U.S. PATENT DOCUMENTS

| | | | |
|---|---|---|---|
| 4,720,667 A | | 1/1988 | Lee et al. |
| 5,066,900 A | * | 11/1991 | Bassett .......................... 323/224 |
| 5,726,872 A | * | 3/1998 | Vinciarelli et al. ............. 363/89 |
| 6,259,235 B1 | * | 7/2001 | Fraidlin et al. ................. 323/222 |
| 7,548,442 B2 | * | 6/2009 | Chou ............................. 363/127 |

OTHER PUBLICATIONS

Kwang-Hwa Liu, Fred C. Lee, "Resonant Switches—A Unified Approach to Improve Performances of Switching Converters," Electrical Engineering Department, Virginia Polytechnic Institute and State University, Blacksburg, Virginia 24061, 1984, pp. 344-351.

Carlos Marcelo De Oliveira Stein, and Hélio Leaes Hey, "A True ZCZVT Commutation Cell for PWM Converters," IEEE Transactions on Power Electronics, vol. 15, No. 1, Jan. 2000, pp. 185-193.

Ilse Cervantes, David García, and Daniel Noriega, "Linear Multiloop Control of Quasi-Resonant Converters," IEEE Transactions on Power Electronics, vol. 18, No. 5, Sep. 2003, pp. 1194-1201.

Esteban Sanchis, Enrique Maset, Jose A. Carrasco, Juan B. Ejea, Agustin Ferreres, Enrique Dede, Vicente Esteve, José Jordan, and Rafael Garcia-Gil, "Zero-Current-Switched Three-Phase SVM-Controlled Buck Rectifier," IEEE Transactions on Industrial Electronics, vol. 52, No. 3, Jun. 2005, pp. 679-688.

(Continued)

*Primary Examiner* — Adolf Berhane
*Assistant Examiner* — Lakaisha Jackson
(74) *Attorney, Agent, or Firm* — Proskauer Rose LLP

(57) ABSTRACT

A power converter includes first and second circuit modules, a first capacitor, a second diode and a control module. The first circuit module includes a switching element in parallel with a first diode. The second circuit module includes a first inductor and the first circuit module. The inductor is in series with the first circuit module. The first capacitor is in parallel with the second circuit module. The second diode includes a first terminal and a second terminal, where the first terminal is in series with the second circuit module and the first capacitor, and the second terminal is coupled to a second power terminal. The control module varies one or more of the first capacitor and the first inductor based on at least one of a current of a load circuit or an input voltage. A resonating waveform is generated by a resonant circuit of the second circuit and is used by the control module to turn off the switching element under zero-current and zero-voltage conditions.

21 Claims, 7 Drawing Sheets

(56) References Cited

OTHER PUBLICATIONS

Milan Ilic and Dragan Maksimovic, "Interleaved Zero-Current-Transition Buck Converter," IEEE Transactions on Industry Applications, vol. 43, No. 6, Nov./Dec. 2007, pp. 1619-1627.

M. Jabbari, and H. Farzanefard, "Analysis and Experimental Results of Switched-Resonator-Based Buck-Boost and Inverting-Buck Converters," 2010 2nd IEEE International Symposium on Power Electronics for Distributed Generation Systems, 2010, pp. 412-416.

M. Jabbari, "Resonant Inverting-Buck Converter," IET Power Electron., vol. 3, Iss. 4, 2010, pp. 571-577.

Guichao Hua, Eric X. Yang, Yimin Jiang, and Fred C. Lee, "Novel Zero-Current-Transition PWM Converters," Virginia Power Electronics Center, The Bradley Department of Electrical Engineering, Virginia Polytechnic Institute & State University, Blacksburg, VA 24061, 1993, pp. 538-544.

Masoud Jabbari, "Unified Analysis of Switched-Resonator Converters," Future IEEE Publication, 1993, pp. 1-33.

Guichao Hua, "Soft-Switching Techniques for Pulse-Width-Modulated Converters," Dissertation Submitted to the Faculty of the Virginia Polytechnic Institute and State University in Partial Fulfillment of the Requirements for the Degree of Doctor of Philosophy in Electrical Engineering, Apr. 22, 1994, pp. 1-203.

M.K. Kazimierczuk, "Analysis and Design of Buck/Boost Zero-Voltage-Switching Resonant DC/DC Convertor", IEE Proceedings, vol. 136, Pt. G, No. 4, Aug. 1989, pp. 157-166.

Milan M. Jovanović, Wojciech A. Tabisz. and Fred C. Y. Lee, "High-Frequency Off-Line Power Conversion Using Zero-Voltage-Switching Quasi-Resonant and Multiresonant Techniques," IEEE Transactions on Power Electronics. vol. 4. No. 4. Oct. 1989, pp. 459-469.

Wojciech A. Tabisz. and Fred C. Y. Lee, "Zero-Voltage-Switching Multiresonant Technique—A Novel Approach to Improve Performance of High-Frequency Quasi-Resonant Converters," IEEE Transactions on Power Electronics, vol. 4. No. 4, Oct. 1989, pp. 450-458.

Isami Norigoe, Yasue Uchiyama and Tamotsu Kohuchi, "ZVS PWM Modified Bridge Converter Utilizing Partial Resonance," INTELEC'91 Nov. 1991, pp. 624-630.

Yu-Mng Chang, Jia-You Lee, Wen-Inne Tsai and York-Yih Sun, "An H-Soft-Switched Cell for Single-Switch Nonisolated DC-to-DC Converters," Control System Laboratory, Department of Electrical Engineering, National Cheng Kung University, Tainan, Taiwan, 1993, pp. 1077-1082.

Ahmed Elasser, and David A. Torrey, "Soft Switching Active Snubbers for DC/DC Converters," IEEE Transactions on Power Electronics, vol. 11, No. 5, Sep. 1996, pp. 710-722.

B. P. Divakar and Danny Sutanto, "Optimum Buck Converter With a Single Switch," IEEE Transactions on Power Electronics, vol. 14, No. 4, Jul. 1999, pp. 636-642.

Huijie Yu, "Driver Based Soft Switch for Pulse-Width-Modulated Power Converters," Dissertation Submitted to the Faculty of the Virginia Polytechnic Institute and State University in Partial Fulfillment of the Requirements for the Degree of Doctor of Philosophy in Electrical Engineering, Feb. 23, 2005 pp. 1-170.

Milan M. Jovanović and Yungtaek Jang "State-of-the-Art, Single-Phase, Active Power-Factor-Correction Techniques for High-Power Applications—An Overview," IEEE Transactions on Industrial Electronics, vol. 52, No. 3, Jun. 2005, pp. 701-708.

Milan M. Jovanović, (Invited Paper) "Resonant, Quasi-Resonant, Multi-Resonant and Soft-Switching Techniques—Merits and Limitation," Int. J. Electronics, vol. 77, No. 5, 1994, pp. 537-554.

Yu-Ming Chang, Jia-You Lee, Wen-Inne Tsai and York-Yih Sun, "Design and Analysis of H-Soft Switch Converters," IEE Pro. Electr. Power Appl., vol. 142, No. 4, Jul. 1995, pp. 255-261.

Wojciech A. Tabisz and Fred C. Lee, "Zero-Voltage-Switching Multi-Resonant Technique—A Novel Approach to Improve Performance of High-Frequency Quasi-Resonant Converters", Virginia Power Electronics Center, Department of Electrical Engineering, Virginia Polytechnic Institute and State University, Blacksburg, VA 24061, Apr. 1988, pp. 9-17.

Robert L. Steigerwald, "High-Frequency Resonant Transistor DC-DC Converters," IEEE Transactions on Industrial Electronics, vol. IE-31, No. 2, May 1984, pp. 181-191.

\* cited by examiner

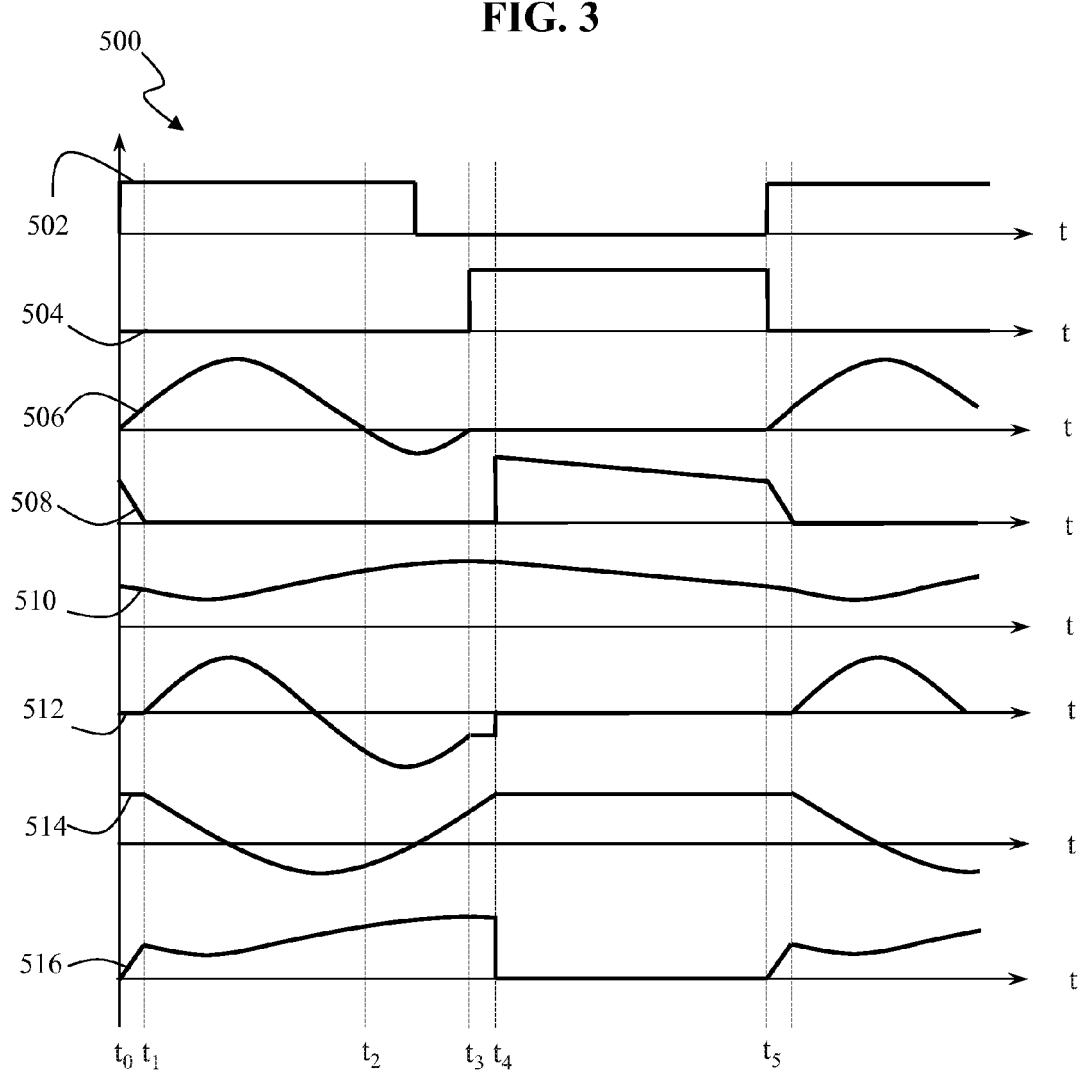

ADJUSTABLE RESONANT BUCK CONVERTER

FIELD OF THE INVENTION

The invention relates generally to minimizing power loss in buck converters, and to apparatuses for and methods of minimizing power loss in resonant buck converter.

BACKGROUND OF THE INVENTION

DC-DC converters are electronic devices used to change DC electrical power from one voltage level to another voltage level. DC-DC converters typically include thyristors, silicon-controlled full-bridge rectifiers with half and full control, and standard buck converters. However, thyristors and silicon-controlled full-bridge rectifiers suffer from high power losses and generate high current ripples. Similarly, standard buck converters are bulky and expensive, because they often include large components. For example, an output inductor of a standard buck converter typically requires high inductance to filter out the high-frequency component of an output waveform. In addition, the freewheeling diode of a standard buck converter typically is mounted on a heat sink because it processes high current. The requirement of a heat sink causes further space constraints. Thus, a standard buck converter is unsuitable for circuits with limited hardware space and cost considerations.

SUMMARY OF THE INVENTION

The invention features a resonant buck converter circuit that is more compact in comparison to a standard buck converter, and includes low power loss and low ripple currents. Because the resonant buck converter of the present invention is based on a resonant topology, the switching loss is negligible. In addition, because the resonant converter can be operated at high switching frequencies, the converter advantageously does not require large components. Furthermore, the resonant converter can dynamically adjust the switching frequency in response to variable circuit characteristics, thereby optimizing switching under zero-current and/or zero-voltage conditions.

In one aspect, a power converter is provided. The power converter includes a first circuit module, a second circuit module, a first capacitor, a second diode and a control module. The first circuit module includes a switching element in parallel with a first diode. The second circuit module includes a first inductor and the first circuit module. The first inductor is in series with the first circuit module. The second circuit module includes a first terminal coupled to a first power terminal. The first capacitor is in parallel with the second circuit module. The first capacitor includes a first terminal coupled to the first terminal of the second circuit module and a second terminal coupled to a second terminal of the second circuit module. The first capacitor is a variable capacitor, the first inductor is a variable inductor, or both the first capacitor and first inductor are variable. The second diode includes a first terminal and a second terminal. The first terminal of the second diode is in series with the second circuit module and the first capacitor. The second terminal of the second diode is coupled to a second power terminal. The control module is adapted to vary one or more of the first capacitor and the first inductor based on at least one of a current of a load circuit or an input voltage. A resonating waveform generated by a resonant circuit of the second circuit is used by the control module to turn off the switching element under zero-current and zero-voltage conditions.

In some embodiments, the first terminal of the second circuit module includes a terminal of the first inductor and the second terminal of the second circuit module includes a terminal of the first circuit module. Alternatively, the first terminal of the second circuit module can include a terminal of the first circuit module and the second terminal of the second circuit module can include a terminal of the first inductor. The power converter can further include a second capacitor in parallel with the first capacitor. The control module can be adapted to disconnect at least one of the first or second capacitors to adjust the resonant capacitance. The power converter can further include a second inductor in parallel with the first inductor. The control module can be adapted to disconnect at least one of the first or second inductors to adjust the resonant inductance. The control module can be adapted to increase the resonant capacitance, decrease the resonant inductance, or increase the resonant capacitance and decrease the resonant inductance if a current of the load circuit is high and the input voltage is low. The control module can be adapted to decrease the resonant capacitance, increase the resonant inductance, or decrease the resonant capacitance and increase the resonant inductance if a current of the load circuit is low and the input voltage is high. The switching element can include a transistor. The first diode can be anti-parallel in polarity with the transistor. The second diode can be connected in parallel with the load circuit. The first and second power terminals can be connected to a DC power source that generates the input voltage. The ratio of the resonant inductance to the resonant capacitance can be less than square of the ratio of the input voltage to the current of the load circuit. In some embodiments, the control module's control of the switching element is not based on pulse-width modulation, pulse-frequency modulation, constant on-time control, or constant off-time control.

In one aspect, a control module for a power converter is provided. The control module includes a first terminal for controlling a switching element. The switching element is in parallel with a first diode defining a first circuit module. The control module also includes a second terminal for controlling a plurality of parallel inductors. The plurality of parallel inductors is in series with the first circuit module. The first circuit module and the plurality of parallel inductors define a second circuit module. The second circuit module includes a first terminal coupled to a first power terminal and a second terminal coupled to a second diode. The control module also includes a third terminal for controlling a plurality of parallel capacitors. Each of the plurality of capacitors include a terminal coupled to the first terminal of the second circuit module and a second terminal coupled to the second terminal of the second circuit module. The control module is adapted to vary the plurality of capacitors and the plurality of inductors based on at least one of a current of a load circuit or an input voltage. The control module is also adapted to turn off the switching element under zero-current and zero-voltage conditions by adjusting a resonating waveform generated by a resonant circuit that is formed by the plurality of capacitors and the plurality of inductors.

In some embodiments, the control module adjusts resonant capacitance and resonant inductance of the resonant circuit such that the ratio of the resonant inductance to the resonant capacitance is less than square of the ratio of an input voltage to a current of a load circuit. The control module can disconnect at least one of the plurality of capacitors to adjust resonant capacitance of the resonant circuit. The control module can disconnect at least one of the plurality of inductors to adjust resonant inductance of the resonant circuit. The control module can turn on the switching element under zero-current conditions. The control module can turn on or off the switching element such that the switching element's on time, off time, or a combination thereof, is variable in a period of operation.

BRIEF DESCRIPTION OF THE DRAWINGS

The advantages of the invention described above, together with further advantages, will be better understood by referring to the following description taken in conjunction with the accompanying drawings. The drawings are not necessarily to scale, emphasis instead generally being placed upon illustrating the principles of the invention.

FIG. 3 illustrates an exemplary timing diagram for operating the buck converter circuit of FIG. 1.

DETAILED DESCRIPTION

Figure 1:
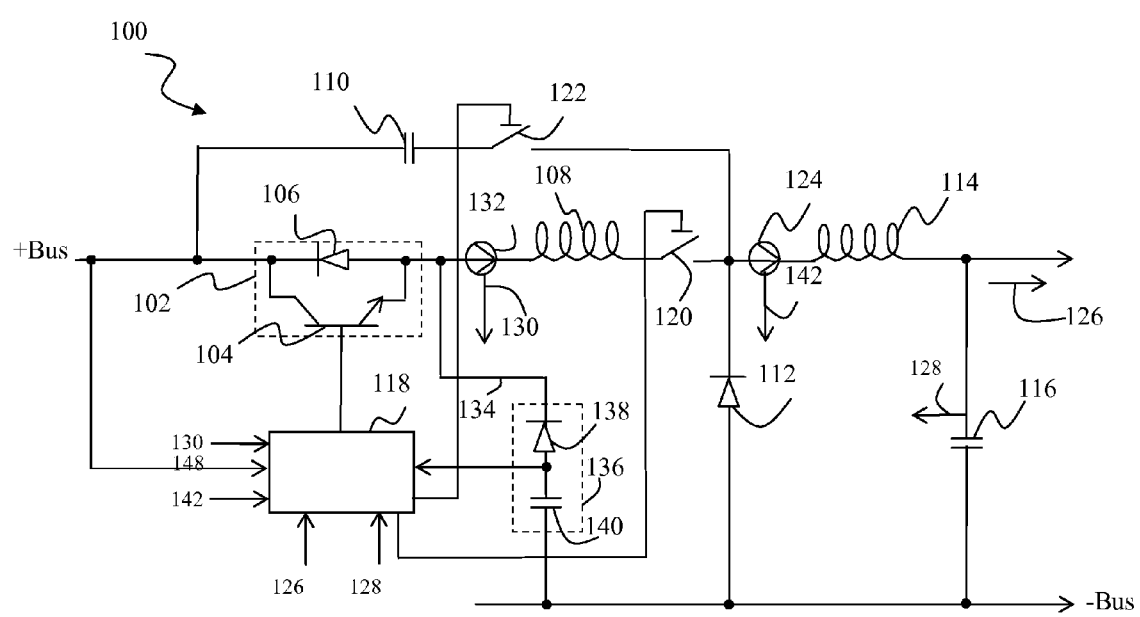
FIG. 1 illustrates a circuit diagram of an adjustable resonant buck converter circuit according to some embodiments.

FIG. 1 illustrates a circuit diagram of an adjustable resonant buck converter circuit 100 according to some embodiments. The converter 100 includes a switching element 102 in series with a positive terminal of a DC power supply (not shown), a resonant inductor 108, an inductor switch 120, and an output inductor 114. The converter 100 also includes a branch having a capacitor 110 in series with a capacitor switch 122. The branch is parallel to the switching element 102, the resonant inductor 108, and the inductor switch 120. The switching element 102 includes a transistor 104 in parallel with a diode 106. The transistor 104 can include, for example, a bipolar junction transistor (BJT) or a field-effect transistor (FET). The diode 106 can be anti-parallel in polarity with the transistor 104. As shown in FIG. 1, the resonant inductor 108 and inductor switch 120 are positioned to the right of the switching element 102 (i.e., on the anode-side of the diode 106). However, the resonant inductor 108 and inductor switch 120 can be positioned to the left of the switching element 102 (i.e., on the cathode-side of the diode 106).

In some embodiments, the inductance value of resonant inductor 108 and/or the capacitive value of capacitor 110 can be varied by a control module as described below.

The converter 100 further includes a diode 112. The cathode of the diode 112 is electrically coupled to the resonant inductor 108, the capacitor 110, and the output inductor 114. The anode of the diode 112 is coupled to a negative terminal of a DC power supply (not shown). The converter 100 can additionally include an output capacitor 116 coupled between the output inductor 114 and the negative terminal of the DC power supply.

In some embodiments, the converter 100 includes a control module 118 coupled to the base/gate terminal of the transistor 104 for turning on or off the transistor 104 based on characteristics of signals measured at various locations of the converter 100. Exemplary signals measured include the output current 126, the output voltage 128, the input voltage 148, the current 130 through the resonant inductor 108, the switch node voltage 134 across the transistor 104, and the current 142 through the output inductor 114. In some embodiments, the control module 118 also monitors the output power calculated based on the output voltage 128 and the output current 126.

The current 130 can include a resonant current generated by the LC circuit formed by the resonant inductor 108 and the capacitor 110. In some embodiments, the current 130 is measured by the current sensor 132 that is positioned between the switching element 102 and the resonant inductor 108. In supplemental or alternative embodiments, the current 130 can be measured by a sensor (not shown) positioned at other junctions of the converter 100—e.g., at the electric junction between the switching element 102 and the power supply (not shown), or between the resonant inductor 108 and the electric junction coupled to the output inductor 114. The switch node voltage 134 across the transistor 104 can be measured between the switching element 102 and the resonant inductor 108. In some embodiments, for purposes of protecting the control module 118, the converter 100 uses a clamping circuit 136, which can include a clamp diode 138 and a clamp capacitor 140, to limit the switch node voltage 134 supplied to the control module 118. In some embodiments, the current 142 of the output inductor 114 is measured using the current sensor 124. In supplemental or alternative embodiments, the current 142 can be measured by a sensor (not shown) positioned at other junctions of the converter 100—e.g., at the electric junction between the output inductor 114 and the capacitor 116. The control module 118 can also actuate the inductor switch 120 and/or capacitor switch 122 such that they are selectively connected or disconnected.

Figure 2A:
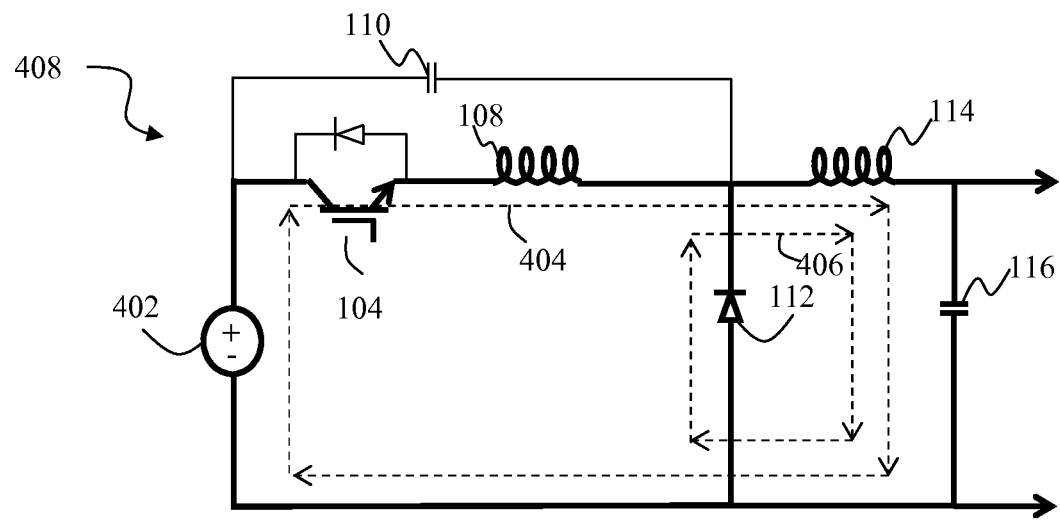
FIGS. 2A-E illustrate various modes for operating the buck converter circuit of FIG. 1.

FIGS. 2A-4E illustrate various modes for operating the buck converter circuit 100 of FIG. 1. The portions of the diagrams highlighted by thick lines indicate active components. FIG. 2A shows an operating mode 408 of the buck converter 100 for the time period [$t_0$, $t_1$]. The control module 118 turns on the transistor 104 at time $t_0$, causing a current 404 to cycle through a path defined by the transistor 104, the resonant inductor 108, the output inductor 114, the output capacitor 116, the load (not shown), and the power supply 402. In addition, a current 406 flows through the output inductor 114, the output capacitor 116 and the load, and freewheels through the diode 112. The voltage across the capacitor 110 is about the same as the input voltage 148 of the power supply 402. The current 404, which linearly rises between the time period [$t_0$, $t_1$], can be expressed as:

$$I_{Lr} = \frac{V_b}{L_r}(t - t_0), \quad \text{(Equation 1)}$$

where $I_{Lr}$ represents the current 404, $V_b$ represents the input voltage 148 of the power supply 402, $L_r$ represents the inductance of the resonant inductor 108, and t represents time. During the operating mode 408, the transistor 104 is turned on by the control module 118 under zero-current conditions because the current 404 that flows through the transistor 104 is zero at $t_0$ and linearly increases thereafter.

In some embodiments, the current 406, which linearly decreases between [$t_0$, $t_1$], can be expressed as:

$$I_D = I_{LO} - \frac{V_b}{L_r}(t - t_0), \quad \text{(Equation 2)}$$

where $I_D$ represents the current 406 and $I_{LO}$ represents the current of the output inductor 114 that is measured, for example, by the current sensor 124. At the end of operating mode 408, the current 406 reaches zero while the current 404 is about the same as the output inductor current. In some embodiments, the control module 118 turns off the diode 112 when the current 406 is about zero which can advantageously result in there being substantially no current flowing through the diode 112.

Figure 2B:
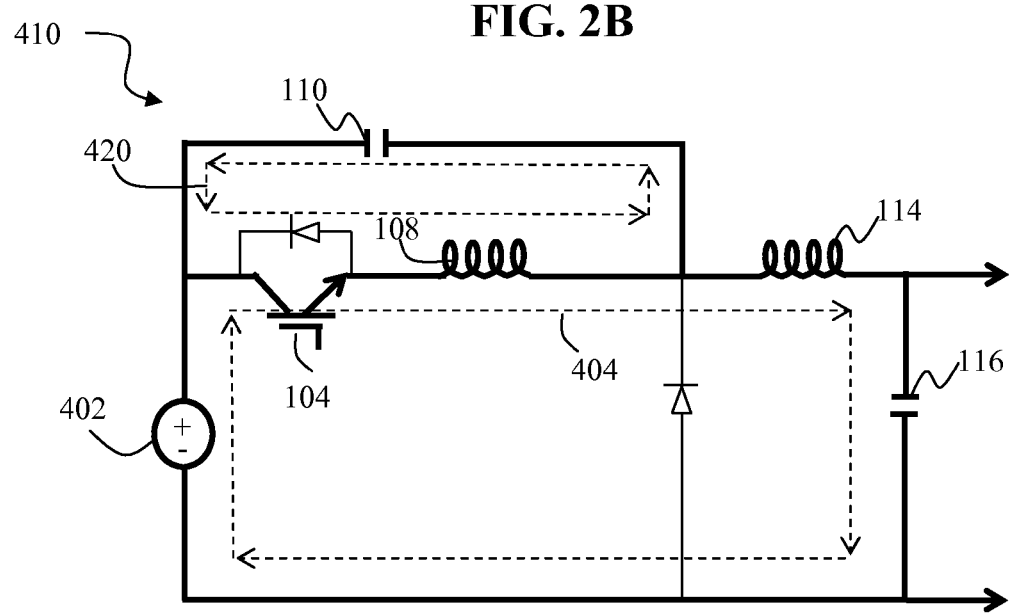

FIG. 2B shows an operating mode 410 of the buck converter 100 in the time period [$t_1$, $t_2$], during which the resonant inductor 108 and the resonant capacitor 110 form a LC circuit that resonates through the transistor 104. As described above, the diode 112 stops conducting at time $t_1$ when the current 404 reaches the level of the current in the output inductor 114.

In some embodiments, resonance current effects between the resonant inductor 108 and the capacitor 110 begin to occur at time $t_1$, at which point the current through the capacitor 110 is zero, the voltage across the capacitor 110 is about the same as the input voltage 148 of the power supply 402, and the current through the resonant inductor 108 is about the same as the current of the output inductor 114. The resonant current 420 developed between the resonant inductor 108 and the capacitor 110 can be expressed as:

$$i'_{Lr}(t - t_1) = \frac{V_b}{\omega L_r} \sin\omega(t - t_1), \quad \text{(Equation 3)}$$

where $i_{Lr}'$ represents the resonant current 420 and $\omega$ represents the resonant angular frequency. The resonant angular frequency $\omega$ can be expressed as:

$$\omega = \sqrt{\frac{1}{L_r C_r}}, \quad \text{(Equation 4)}$$

where $L_r$ represents the inductance of the resonant inductor 108 and $C_r$ represents the capacitance of the capacitor 110. The voltage across the resonant capacitor 110 can be expressed as:

$$v_{Cr}(t-t_1) = V_b \cos \omega(t-t_1). \quad \text{(Equation 5)}$$

Equation (5) indicates that, in the operating mode 410, the voltage across the capacitor 110 decreases as the power supply 402 charges the resonant inductor 108, the transistor 104, and the output inductor 114.

Figure 2C:
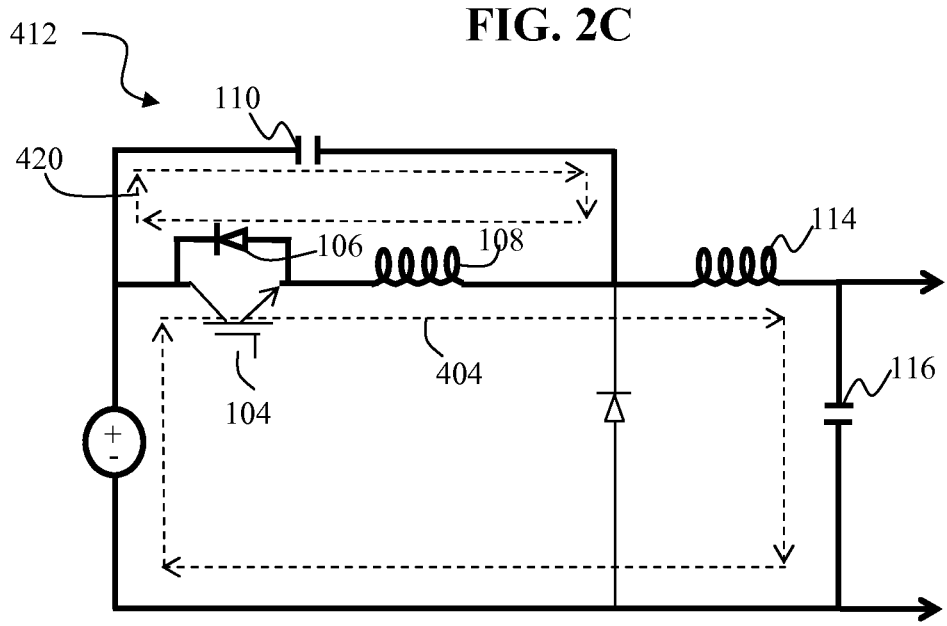

FIG. 2C shows an operating mode 412 of the buck converter 100 in the time period [$t_2$, $t_3$]. At time $t_2$, the resonant current 420 changes polarity. In such an instance, the resonant current 420 reverses direction and flows back to the capacitor 110 via diode 106. Therefore, the voltage drop across the transistor 104 is equal to or close to the ON voltage drop of the diode 106. When the resonant current 420 through the transistor 104 reaches zero, the control module 118 can be configured to turn off the transistor 104, thereby realizing switching under zero-carried current and/or zero-voltage conditions. After the transistor 104 is turned off, the current of the output inductor 114 is provided by the capacitor 110, by the power supply 402 charging the capacitor 110. At time $t_3$, which represents the end of the operating mode 412, the resonant current 420 becomes about the same as the current in the output inductor 114.

Figure 2D:
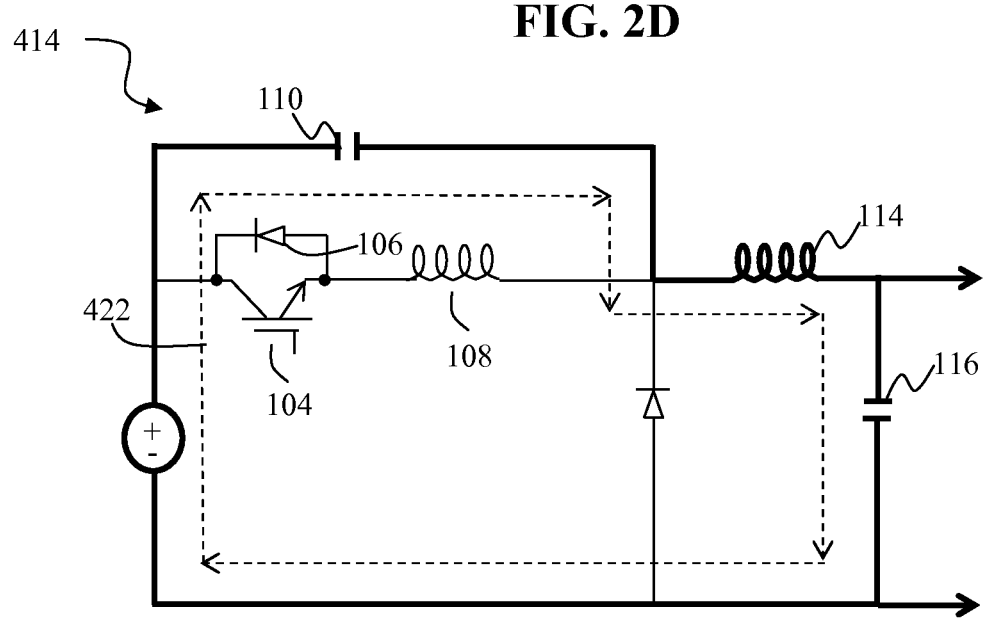

FIG. 2D shows an operating mode 414 of the buck converter 100 in the time period [$t_3$, $t_4$]. As shown, a current 422 flows through the output inductor 114 and is charged via the capacitor 110 by the input voltage of the power supply 402. Operating mode 414 ends at time $t_4$ when the capacitor 110 is fully charged and has a voltage that is equal to or about the same as the input voltage of the power supply.

Figure 2E:
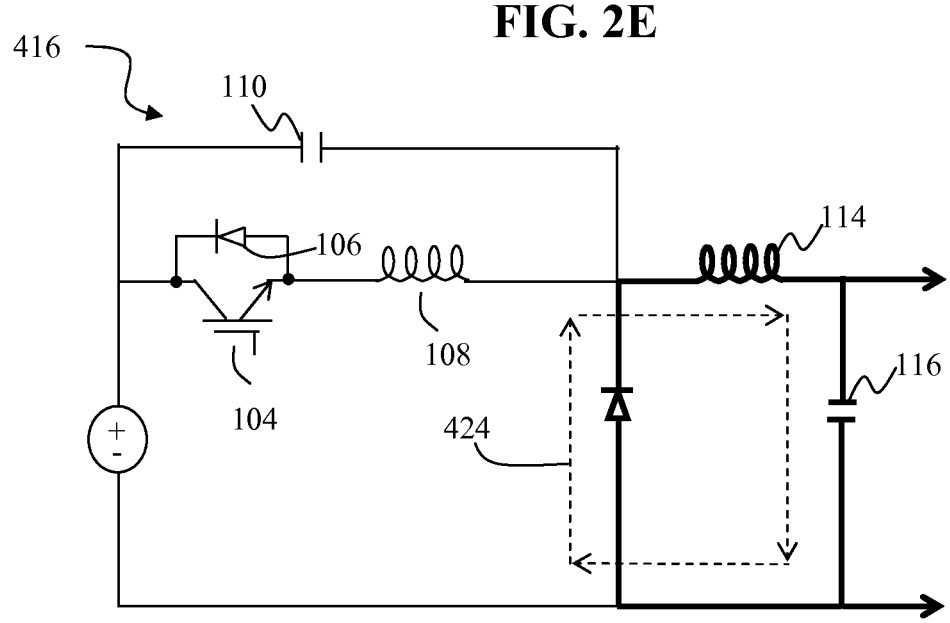

FIG. 2E shows an operating mode 416 of the buck converter 100 in the time period [$t_4$, $t_5$]. A current 424 flows through the output inductor 114 and freewheels through the diode 112. The current 424 linearly decreases until the transistor 104 is turned on by the control module 118 at time $t_5$, at which point the buck converter returns to operating mode 408. Depending on the duration of the operating mode 416, the output inductor current can decrease to zero before the transistor 104 is turned on. This can create a discontinuous-conduction mode (DCM) or a continuous-conduction mode (CCM) for operating the converter 100. The switching frequency is also dependent on the duration of the operating mode 416 as it controls the amount of time the transistor 104 is turned off.

FIG. 3 illustrates an exemplary timing diagram 500 for operating the buck converter circuit 100 of FIG. 1 and the timing conditions corresponding to the operating modes of FIGS. 2A-2E. The timing diagram 500 shows the waveforms of a base/gate signal 502 of the transistor 104, the voltage 504 across the transistor 104, the current 506 of the transistor 104, the current 508 of the diode 112, the current 510 of the output inductor 114, the current 512 of the capacitor 110, the voltage 514 across the capacitor 110 and the current of the power supply 402. In some embodiments, the voltage 504 across the transistor 104 is limited by the clamping circuit 136 before being measured by the control module 118. The current 506 of the transistor 104 can be measured by the current detector 132. The current 510 of the output inductor 114 can be measured by the current detector 124. The control module 118 can interact with the base/gate signal 502 to turn on or off the transistor 104. For example, the control module 118 can trigger the base/gate signal 502 to logic low, thus shutting down the transistor 104. The logic levels for the base/gate signal 502 that result in turning off the transistor 104 is a design choice. Accordingly, in some embodiments, logic high of base/gate signal 502 can turn the transistor 104 off.

The time period [$t_0$, $t_1$] represents the operating mode 408 of the buck converter 100. The transistor 104 is turned on at time $t_0$ by the control module 118, as demonstrated by the base/gate signal 502 transitioning from logic low to logic high at time $t_0$. This causes the current 506 of the transistor 104 to linearly increase from zero to become about equal to the current 510 of the output inductor 114 at time $t_1$. In contrast, the current 508 of the diode 112 linearly decreases until reaching zero at time $t_1$, at which point the diode 112 is turned off at zero current. In addition, the voltage 514 across the resonant capacitor 110 is about the same as the input voltage of the power supply 402 during the time period [$t_0$, $t_1$].

The time period [$t_1$, $t_2$] represents the operating mode 410 of the buck converter 100. During this period, the resonant inductor 108 and the capacitor 110 begin to resonant through the transistor 104, as demonstrated by the resonance in the current 506 of the transistor 104 and the current 512 of the capacitor 110. At time $t_2$, the current 512 of the resonant capacitor 110 switches its polarity by changing from a positive signal to a negative signal. In addition, the voltage 514 across the capacitor 110 decreases during the time period [$t_1$, $t_2$] as the power supply 402 charges the output inductor 114, the resonant inductor 108 and the transistor 104.

The time period [$t_2$, $t_3$] represents the operating mode 412 of the buck converter 100. During this time period, when the current 506 of the transistor 104 reaches zero through resonance, the transistor 104 is turned off by the control module 118. This switching is also realized under zero-voltage conditions because the voltage 504 across the transistor 104 at the time of switching is zero. In some embodiments, even though the current 506 through the transistor 104 reaches zero at time $t_3$, the control module 118 turns off the transistor 104 before time $t_3$ to guarantee soft switching of the transistor 104. For example, as shown in the timing diagram 500, the falling edge of the base/gate signal 502 of the transistor 104 is between [$t_2$, $t_3$]. In addition, during the time period [$t_2$, $t_3$], the current 510 of the output inductor 114 is charged by the power supply 402 through the capacitor 110. At the end of the mode 412, the current 512 of the capacitor 110 is about equal in magnitude to the current 510 of the output inductor 114, at which point the the anti-parallel diode 106 is turned off.

The time period [$t_3$, $t_4$] represents the operating mode 414 of the buck converter 100. During this mode 414, the transistor 104 and the diode 106 remain turned off. The current 510 of the output inductor 114 is continuously charged through the capacitor 110 by the power supply 402.

The time period [$t_4$, $t_5$] represents the operating mode 416 of the buck converter 100, during which both the transistor 104 and the diode 106 remain turned off. The current 510 of the output inductor 114 freewheels through the diode 112 and linearly decreases until the transistor 104 is turned on by the control module 118 at time $t_5$, which initiates the operating mode 408.

In general, to achieve zero-current switching when the transistor 104 is turned off during the time period [$t_2$, $t_3$], the control module 118 can be configured to ensure that the following criterion is satisfied:

$$\frac{L_r}{C_r} < \left(\frac{V_b}{I_{LO}}\right)^2, \quad \text{(Equation 6)}$$

where $L_r$ represents the resonant inductance, $C_r$ represents the resonant capacitance, $V_b$ represents the input voltage and $I_{LO}$ represents the current of the output inductor 114, which indicates the heaviness of the load circuit formed by the output inductor 114 and the output capacitor 116.

As represented by Equation (6), a heavier load (high $I_{LO}$) and a lower input voltage (low $V_b$) indicates that a higher resonant capacitance (high $C_r$) and a lower resonant inductance (low $L_r$) are desired to achieve zero-current switching when the transistor 104 is turned off during the time period [$t_2$, $t_3$]. In addition, as represented by Equation (6), a lighter load (low $I_{LO}$) and a higher input voltage (high $V_b$) indicates that a lower resonant capacitance (low $C_r$) and a higher resonant inductance (high $L_r$) are desired to achieve zero-current switching when the transistor 104 is turned off during the time period [$t_2$, $t_3$]. Hence, it is advantageous if the control module 118 can adjust the resonant inductance and the resonant capacitance in response to variations in at least one of the load circuit conditions or input voltage.

Figure 4A:
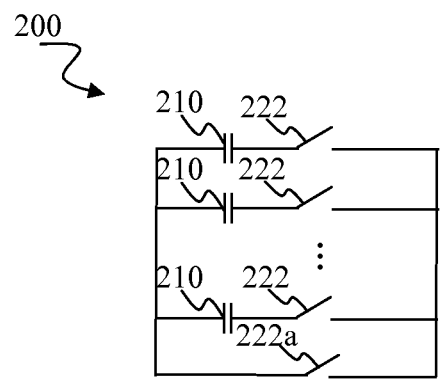
FIGS. 4A-B illustrate alternative configurations for several components of the buck converter circuit of FIG. 1.
Figure 4B:
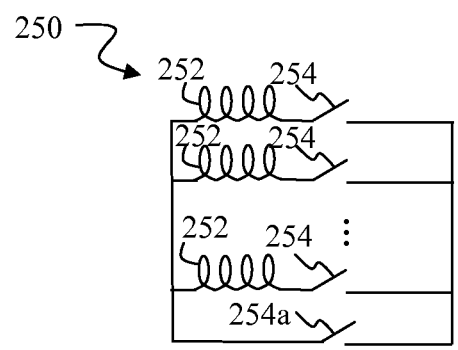

FIGS. 4A-B illustrate embodiments of variable resonant inductor 108 and variable capacitor 110 components of the buck converter 100 that are used by the control module 118 to adjust the resonant capacitance and the resonant inductance of the converter 100. FIG. 4A shows an exemplary capacitor structure 200 for capacitor 110 having multiple parallel branches. A branch can include a capacitor 210 in series with a capacitor switch 222. In some embodiments, the capacitor structure 200 includes a branch having only a switch 222. The capacitors 210 can have the same and/or different capacitance values. The capacitor structure 200 can replace the resonant capacitor 110 and the switch 122 of FIG. 1. Each of the capacitor switches 222 can be controlled by the control module 118 such that the control module 118 selectively connects and/or disconnects any one of the capacitors 210 to adjust the overall capacitance of the capacitor structure 200.

FIG. 4B shows an exemplary inductor structure 250 for resonant inductor 108 having multiple parallel branches. A branch can include a resonant inductor 252 in series with an inductor switch 254. In some embodiments, the inductor structure 250 includes a branch having only a switch 254. The inductors 252 can have about the same or varying values of inductance. The inductor structure 250 can replace the resonant inductor 108 and the switch 120 of FIG. 1. Each of the switches 254 can be controlled by the control module 118 such that the control module 118 selectively connects and/or disconnects any one of the resonant inductors 252 to adjust the overall inductance of the inductor structure 250.

The converter 100 can include one or both of the capacitor structure 200, in place of the capacitor 110, and the inductor structure 250, in place of the resonant inductor 108. In operation, the control module 118 can adjust the resonance frequency of the converter 100 in response to variations in input voltage and/or load circuit conditions by selectively connecting and/or disconnect one or more capacitors in the structures 200 and/or one or more inductors in the structure 250. In some embodiments, the control module 118 adjusts the resonant frequency by satisfying Equation (6). For example, if the load is heavy and the input voltage is low, then the control module 118 can be configured to disconnect all the switches 222 in the structure 200 (except the short switch 222a that remains closed) to maximize resonant capacitance while configured to connect the switch 254a in the structure 250 to minimize resonant inductance. As another example, under very light load conditions, a standard buck converter is sufficient. Therefore, to disengage the resonant LC circuit from the converter design 100, the control module 118 can be configured to open all the switches in the capacitor structure 200 to disconnect the corresponding capacitors. The control module 118 can also be configured to open all but one of the switches 254 in the inductor structure 250. Therefore, by manipulating the resonant frequency, the control module 118 can dynamically adjust both the on and off times of the transistor 104 to optimize zero-current switching in response to variations in load and input voltage.

In some embodiments, the switch 120 of FIG. 1 can be replaced by a saturable-core reactor (not shown) such that the resonant inductor 108 is connected in series with the reactor. A saturable-core reactor can create a variable inductance as a function of load current. For example, for a light load, the resonant current created by the resonant inductor 108 and the resonant capacitor 110 is lower than normal. This can cause the saturable-core reactor to increase its inductance, which increases the overall resonant inductance of the resonant circuit. As a result, the resonant frequency is decreased to facilitate zero-current switching at the light load. In contrast, for a heavy load, the resonant current is higher than normal and this causes the saturable-core reactor to become saturated, thereby reducing its inductance and the overall resonant inductance of the resonant circuit. As a result, the resonant frequency is increased to facilitate zero-current switching at the heavy load.

Figure 5:
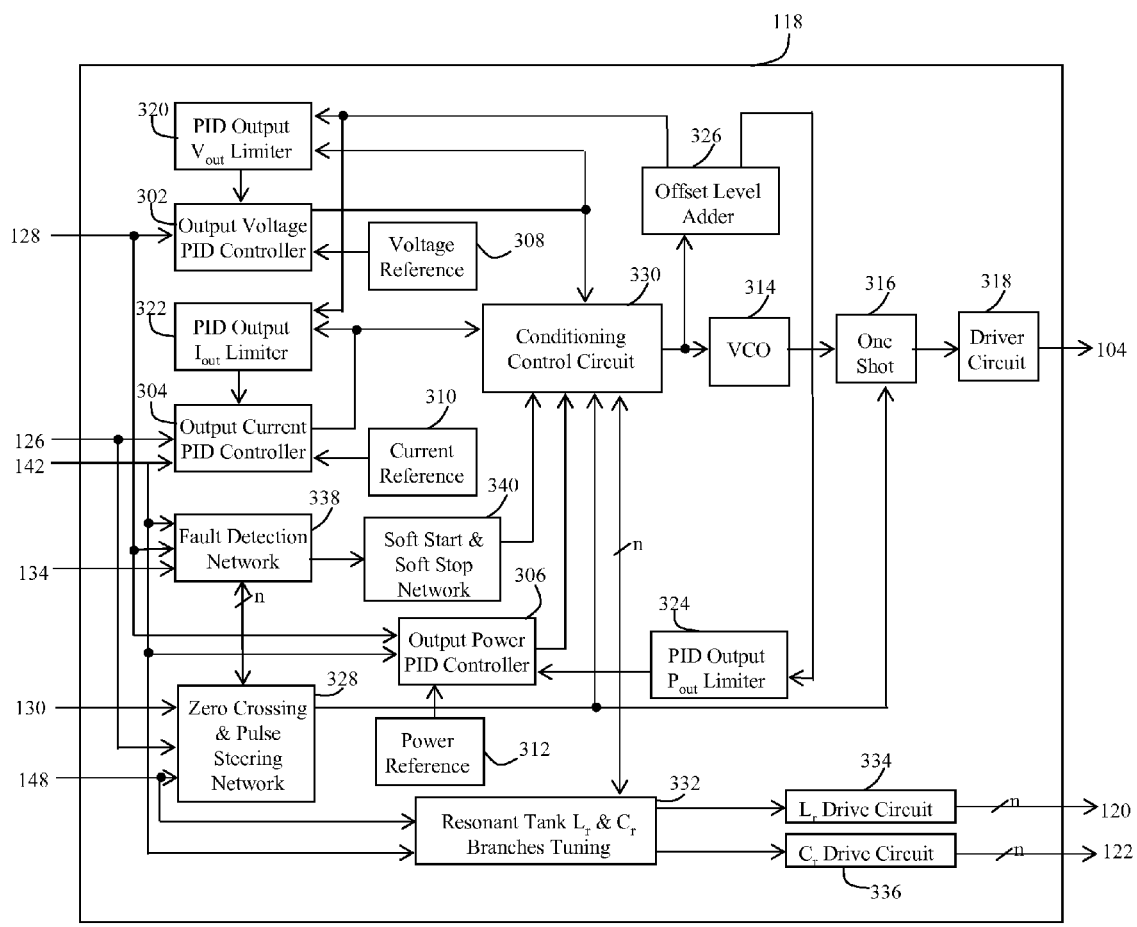
FIG. 5 illustrates an exemplary control module of the buck converter circuit of FIG. 1.

FIG. 5 illustrates an exemplary control module 118 of the buck converter circuit 100 of FIG. 1. Control module 118 can operate by varying both the ON and OFF time durations of the switching element 102. Control module 118 takes as inputs the output voltage 128, the output current 126, the output inductor current 142, the switch node voltage 134, the resonant inductor current 130 and the input voltage 148. In some embodiments, the control module 118 produces output signals to control the gate/base terminal of the transistor 104. In some embodiments, the control module 118 produces output signals to control one or both of the capacitor switch 122 and the inductor switch 120 of FIG. 1. In some embodiments, the control module 118 produces output signals to control the switches 222 of the capacitor structure 200 in FIG. 4A and/or the switches 254 of the inductor structure 250 in FIG. 4B.

The control module 118 includes three Proportional-Integral-Derivative (PID) controllers: the output voltage PID controller 302, the output current PID controller 304 and the output power PID controller 306. The output current PID controller 304 can have the greatest bandwidth of all three controllers, followed by the output voltage controller 302 and the output power PID controller 306. Depending on the load conditions, only one of the PID controllers 302, 304 and 306 is in operation. For example, under normal operating conditions, only output voltage PID controller 302 controls. However, if the load is shorted, for example, the output current 126 is adapted to raise sharply, in which case the output current PID controller 304 takes over control since it has the highest bandwidth. If the output voltage PID controller 302 is in charge, it uses an internal precision voltage reference 308 to force the output voltage to a desired value. Similarly, if the output current PID controller 304 is in control, it uses an internal precision current reference 310 to force the output current to a desired value. If the output power PID controller 306 is in control, it uses an internal precision power reference 312 to force the output power to a desired value. Such value is propagated to the output by using a voltage-controlled oscillator (VCO) 314 that feeds into the monostable (one-shot) module 316, whose output is in turn supplied into a driver circuit module 318 to drive the gate or base terminal of the transistor 104.

In some embodiments, each of the PID controllers 302, 304 and 306 is associated with a PID output limiter 320, 322 or 324, respectively. Each of the PID output limiters 320, 322 and 324 can, for example, be a clamp. Specifically, in some embodiments, each of the PID output limiters 320, 322 and 324 is clamped in such a manner that when another PID controller takes over control, the amount of time needed to react from saturation to active mode is minimized. An offset-level adder module 326 can be coupled to the PID limiters 320, 322 and 324 to alter the clamp voltage level.

In addition, the control module 118 includes a zero-crossing and pulse-steering network module 328 and a conditioning control circuit module 330. Each of modules 328 and 330 takes as inputs the resonant inductor current 130 and the input voltage 148. The modules 328 and 330 use these two inputs to determine when to turn on or off the power stage of the transistor 102. For example, if there is no output load, meaning that the output current 126 is substantially zero, the modules 328 and 330 can cause the one-shot module 316 to output a signal having a minimum pulse width equal to $0.5*T_r$, where $T_r$ is the resonant time. This pulse width is adapted to turn on the transistor 104. If the output load is normal, meaning that the output current 126 is within the minimum and maximum range of the resonant inductor current 130, the modules 328 and 330 can cause the one-shot module 316 to output a signal having a pulse width within the range of $0.5*T_r$ to $0.8*T_r$. This pulse width is adapted to turn on the transistor 104. If the load is heavy, meaning that the output current 126 is greater than the maximum resonant inductor current 130, the modules 328 and 330 can cause the one-shot module 316 to output a signal having a pulse width equal to about $0.85*T_r$. This pulse width is adapted to turn on the transistor 104. Therefore, under such a pulse-width modulation scheme, the transistor's on time and/or off time can be variable in a period of operation. In addition, the associated duty cycle and duration of the period can be variable.

In general, control module 118 is not limited by constraints associated with pulse width modulation (PWM), pulse frequency modulation (PFM), and/or constant-on or -off times. For example, while PWM varies the duty cycle, the period of time is constant. Similarly, while PFM varies the frequency, the duty cycle is constant. With respect to the constant-on time modulation technique, the period of time the signal is on is constant while the time the signal is off is variable. Similarly, the constant-off time modulation technique is constrained by the period of time the signal is off. Control module 118 is not limited by constant periods, constant duty cycles, constant on times and/or constant off times. In general, control module 118 can modulate in a hybrid manner by leaving these values variable. As a result, the drive signal to transistor 104 is advantageously based, in part, on the current state conditions of the circuit 100 without constraints associated with time periods, frequency, or constant on/off times.

Furthermore, the control module 118 includes a resonant $L_r$ and $C_r$ tuning module 332, a $L_r$ drive circuit 334, and a $C_r$ drive circuit 336. The modules 332, 334 and 336 ensure that the control module 118 operates under zero-current switching (ZCS) conditions when the transistor 104 is turned on or off.

The control module 118 also includes a fault detection network module 338 and a soft-start/soft-stop network module 340. The fault detection network module 338 monitors at least one of the output voltage 128, the output inductor current 142 and the switch node voltage 134 for abnormalities, such as occurrences of over-voltage, under-voltage or over-current conditions. If an abnormality is detected by the fault detection network module 338, the soft-start/soft-stop network module 340 executes a controlled shutdown of the system and automatic recovery at a later time when the abnormality ceases.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A power converter comprising:
   a first circuit module including a switching element in parallel with a first diode;
   a second circuit module including a first inductor and the first circuit module, the first inductor being in series with the first circuit module, the second circuit module including a first terminal coupled to a first power terminal;
   a first capacitor in parallel with the second circuit module, the first capacitor including a first terminal coupled to the first terminal of the second circuit module and a second terminal coupled to a second terminal of the second circuit module, wherein the first capacitor is a variable capacitor, the first inductor is a variable inductor, or both the first capacitor and first inductor are variable;
   a second diode including a first terminal and a second terminal, the first terminal in series with the second circuit module and the first capacitor, the second terminal coupled to a second power terminal; and
   a control module for varying one or more of the first capacitor and the first inductor based on at least one of a current of a load circuit or an input voltage, wherein a resonating waveform generated by a resonant circuit of the second circuit is used by the control module to turn off the switching element under zero-current and zero-voltage conditions.

2. The power converter of claim 1 wherein the first terminal of the second circuit module comprises a terminal of the first inductor and the second terminal of the second circuit module comprises a terminal of the first circuit module.

3. The power converter of claim 1 wherein the first terminal of the second circuit module comprises a terminal of the first circuit module and the second terminal of the second circuit module comprises a terminal of the first inductor.

4. The power converter of claim 1 further comprising a second capacitor in parallel with the first capacitor.

5. The power converter of claim 4 wherein the control module is adapted to disconnect at least one of the first or second capacitors to adjust the resonant capacitance.

6. The power converter of claim 1 further comprising a second inductor in parallel with the first inductor.

7. The power converter of claim 6 wherein the control module is adapted to disconnect at least one of the first or second inductors to adjust the resonant inductance.

8. The power converter of claim 1 wherein the control module is adapted to increase the resonant capacitance, decrease the resonant inductance, or increase the resonant capacitance and decrease the resonant inductance if a current of the load circuit is high and the input voltage is low.

9. The power converter of claim 1 wherein the control module is adapted to decrease the resonant capacitance, increase the resonant inductance, or decrease the resonant capacitance and increase the resonant inductance if a current of the load circuit is low and the input voltage is high.

10. The power converter of claim 1 wherein the switching element comprises a transistor.

11. The power converter of claim 10 wherein the first diode is anti-parallel in polarity with the transistor.

12. The power converter of claim 1 wherein the second diode is connected in parallel with the load circuit.

13. The power converter of claim 1 wherein the first and second power terminals are connected to a DC power source that generates the input voltage.

14. The power converter of claim 1 wherein the ratio of the resonant inductance to the resonant capacitance is less than square of the ratio of the input voltage to the current of the load circuit.

15. The power converter of claim 1 wherein the control module's control of the switching element is not based on pulse-width modulation, pulse-frequency modulation, constant on-time control, or constant off-time control.

16. A control module for a power converter comprising:
a first terminal for controlling a switching element, the switching element in parallel with a first diode defining a first circuit module;
a second terminal for controlling a plurality of parallel inductors, the plurality of parallel inductors in series with the first circuit module, the first circuit module and the plurality of parallel inductors defining a second circuit module, the second circuit module including a first terminal coupled to a first power terminal and a second terminal coupled to a second diode; and
a third terminal for controlling a plurality of parallel capacitors, each of the plurality of capacitors including a terminal coupled to the first terminal of the second circuit module and a second terminal coupled to the second terminal of the second circuit module,
wherein the control module is adapted to vary the plurality of capacitors and the plurality of inductors based on at least one of a current of a load circuit or an input voltage, and to turn off the switching element under zero-current and zero-voltage conditions by adjusting a resonating waveform generated by a resonant circuit that is formed by the plurality of capacitors and the plurality of inductors.

17. The control module of claim 16 wherein the control module is adapted to adjust resonant capacitance and resonant inductance of the resonant circuit such that the ratio of the resonant inductance to the resonant capacitance is less than square of the ratio of an input voltage to a current of a load circuit.

18. The control module of claim 16 wherein the control module is adapted to disconnect at least one of the plurality of capacitors to adjust resonant capacitance of the resonant circuit.

19. The control module of claim 16 wherein the control module is adapted to disconnect at least one of the plurality of inductors to adjust resonant inductance of the resonant circuit.

20. The control module of claim 16 wherein the control module is adapted to turn on the switching element under zero-current conditions.

21. The control module of claim 16 wherein the control module is adapted to turn on or off the switching element such that the switching element's on time, off time, or a combination thereof, is variable in a period of operation.

* * * * *